US005667282A

United States Patent [19]
Kim

[11] Patent Number: 5,667,282
[45] Date of Patent: Sep. 16, 1997

[54] ELECTRONIC PARKING BRAKE DEVICE FOR VEHICLES AND CONTROL METHOD THEREFOR

[75] Inventor: Chong Hoon Kim, Seoul, Rep. of Korea

[73] Assignee: Kia Motors Corporation, Seoul, Rep. of Korea

[21] Appl. No.: 672,847

[22] Filed: Jul. 25, 1996

[30] Foreign Application Priority Data

Apr. 22, 1996 [KR] Rep. of Korea ................... 1996-12187

[51] Int. Cl.[6] .............................. B60T 13/74; F16D 67/00
[52] U.S. Cl. .................................... 303/3; 192/9
[58] Field of Search ...................... 477/197, 198; 188/2 D, 72.1, 181 C, 181 R, 181 T, 353, 355, 358, 182, 3 H; 303/3, 24.1, 192; 180/282; 192/4 A, 4 R, 7, 9

[56] References Cited

U.S. PATENT DOCUMENTS

| | | | |
|---|---|---|---|
| 4,561,527 | 12/1985 | Nakamoto et al. | 192/9 |
| 4,629,043 | 12/1986 | Matsuo et al. | 188/2 D |
| 4,717,207 | 1/1988 | Kubota et al. | 303/3 |
| 4,804,073 | 2/1989 | Taig et al. | 188/72.8 |
| 5,281,007 | 1/1994 | Brainard | 303/3 |

*Primary Examiner*—Robert J. Oberleitner
*Assistant Examiner*—Chris Schwartz

[57] ABSTRACT

An electronic parking brake device for a vehicle including a slope sensor adapted to sense the slope of a road on which the vehicle is parked, and a parking brake control unit adapted to automatically carry out a control for a brake unit in response to the sensing operation of the slope sensor. The electronic parking brake device also includes a movement sensor adapted to sense a movement of the parked vehicle to achieve a secondary parking brake control. By this arrangement, the electronic parking brake device can prevent its brake control unit from malfunctioning due to electronic noise. Accordingly, it provides a safety and convenience to the driver. In particular, the electronic parking brake device of the present invention operates automatically to firmly prevent the vehicle from freely moving on a road with a slope. Accordingly, it is possible not only to provide an improvement in the security of passengers, but also to surely prevent the vehicle from being damaged.

1 Claim, 4 Drawing Sheets

ELECTRONIC PARKING BRAKE DEVICE FOR VEHICLES AND CONTROL METHOD THEREFOR

BACKGROUND OF THE INVENTION

1. Field of the Invention

The present invention relates to an electronic parking brake device for vehicles and a control method therefor, and more particularly to an electronic parking brake device capable of receiving a sensing signal generated from a sensor on a road with a slope, thereby automatically achieving a parking-braking operation to provide safety and convenience to the driver, and a method for controlling the electronic parking brake device.

2. Description of the Prior Art

Referring to FIG. 1, a transmission gear shift lever of a manual parking brake device having a conventional construction is illustrated. Such a manual parking brake device is provided in a vehicle to prevent the wheels of the vehicle from rotating due to its thrust under a condition that there is no driver nor passenger in the vehicle in a parked or stopped state of the vehicle. As schematically shown in FIG. 1, the conventional parking brake device includes a manipulating lever coupled to a brake member via a wire. When the driver manually manipulates the manipulating lever, the wire is tensed to actuate the brake member. The brake member comes into frictional contact with the shaft of the wheels, thereby preventing the wheels from rotating. Thus, any thrust of the vehicle is avoided.

However, such a conventional parking brake device involves a problem in that the wire may be cut when the driver pulls the manipulating lever with an excessive force. The wire pulling force is proportional to the frictional contact force of the brake member against the wheel shaft. Although the vehicle is parked on a road with a slope, it may be thrusted where the slope of the road is very sharp unless the wire pulling force is high enough to obtain a very high frictional contact force of the brake member. In this case, there is a degradation in the safety of passengers in the vehicle and possible damage of the vehicle.

SUMMARY OF THE INVENTION

Therefore, an object of the invention is to solve the above-mentioned problems involved in the prior art and to provide an electronic parking brake device capable of receiving a sensing signal generated from a sensor on a road with a slope, thereby automatically achieving a parking-braking operation to provide a safety and convenience to the driver, and a method for controlling the electronic parking brake device.

In accordance with one aspect, the present invention provides an electronic parking brake device for a vehicle comprising: a parking brake switch installed in the interior of the vehicle and adapted to supply power to desired elements of the parking brake device; a slope sensor for receiving the power from the parking brake switch so that it can be activated to sense the slope of a road on which the vehicle is parked; a parking brake control unit for receiving an output signal from the slope sensor and generating a control signal based on the received signal; a hydraulic brake unit adapted to generate a hydraulic brake force; and a hydraulic pressure control unit for receiving the control signal from the parking brake control unit to control hydraulic pressure applied to the hydraulic brake unit.

The electronic parking brake device may further comprise a movement sensor for receiving the power from the parking brake switch so that it can be activated to sense a movement of the parked vehicle, thereby generating a sensing signal, the movement sensor sending the sensing signal to the parking brake control unit.

In accordance with another aspect, the present invention provides a method for controlling an electronic parking brake device including a parking brake switch adapted to supply power to desired elements of the parking brake device, a slope sensor adapted to sense the slope of a road on which the vehicle is parked, a parking brake control unit adapted to generate a control signal based on a sensing signal from the slope sensor, a hydraulic brake unit adapted to generate a hydraulic brake force, and a hydraulic pressure control unit adapted to control hydraulic pressure applied to the hydraulic brake unit under control of the parking brake control unit, a movement sensor adapted to sense a movement of the parked vehicle, and an alarming unit adapted to generate an alarm under control of the parking brake control unit, the method comprising the steps of: switching on the parking brake switch to energize the slope sensor and the movement sensor; determining whether or not the slope sensor has generated its sensing signal; if the slope sensor has generated the sensing signal, automatically driving the parking brake control unit based on the sensing signal from the slope sensor, thereby generating a control signal for providing an appropriate driving condition of the hydraulic brake unit; if the slope sensor has generated no sensing signal, forcibly driving the parking brake control unit; determining whether or not the movement sensor has generated its sensing signal; and sending the sensing signal from the movement sensor to the parking brake control unit so that the parking brake control unit can send a control signal to the alarming unit to generate an alarm.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
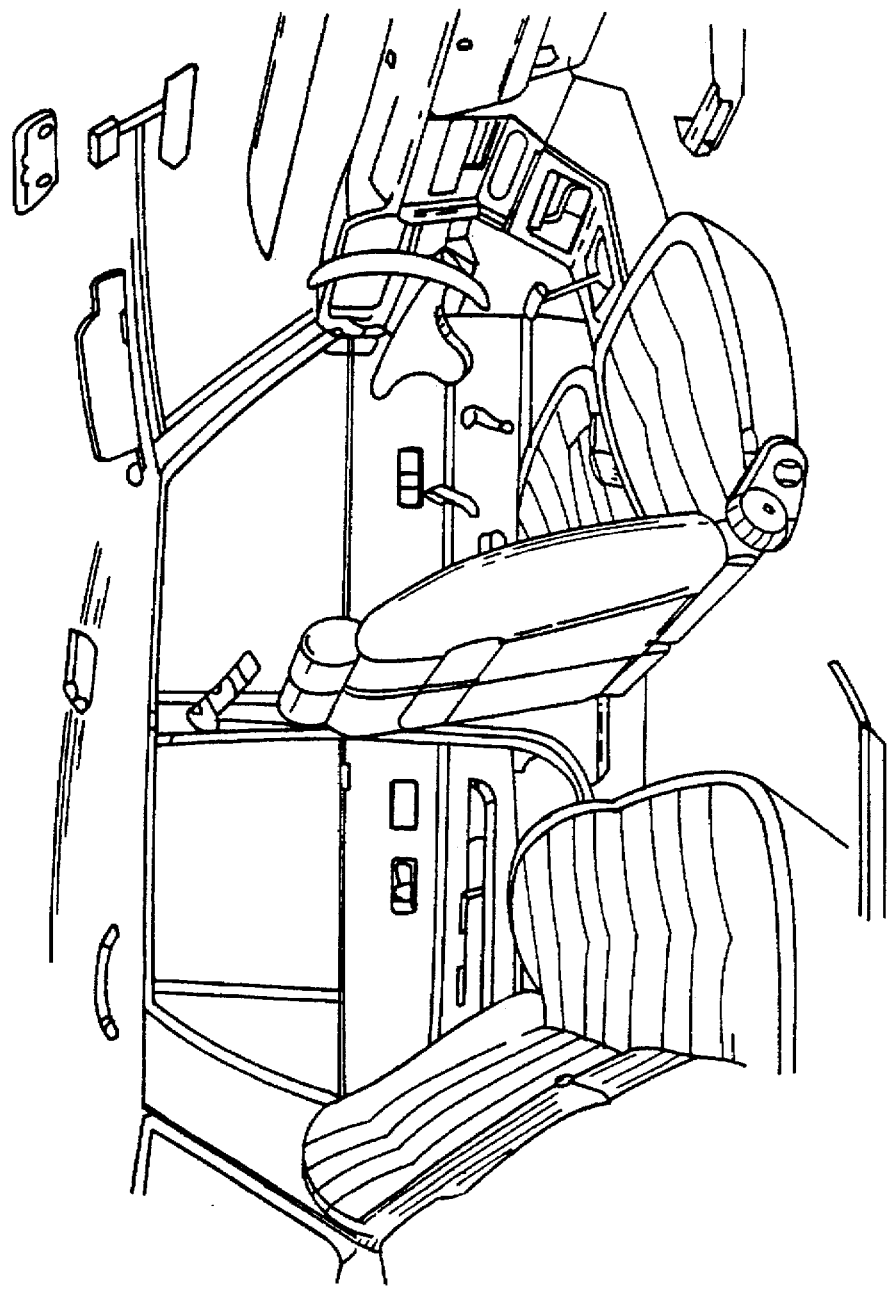
FIG. 1 is a partial perspective view of a manual parking brake device having a conventional construction.
Figure 2:
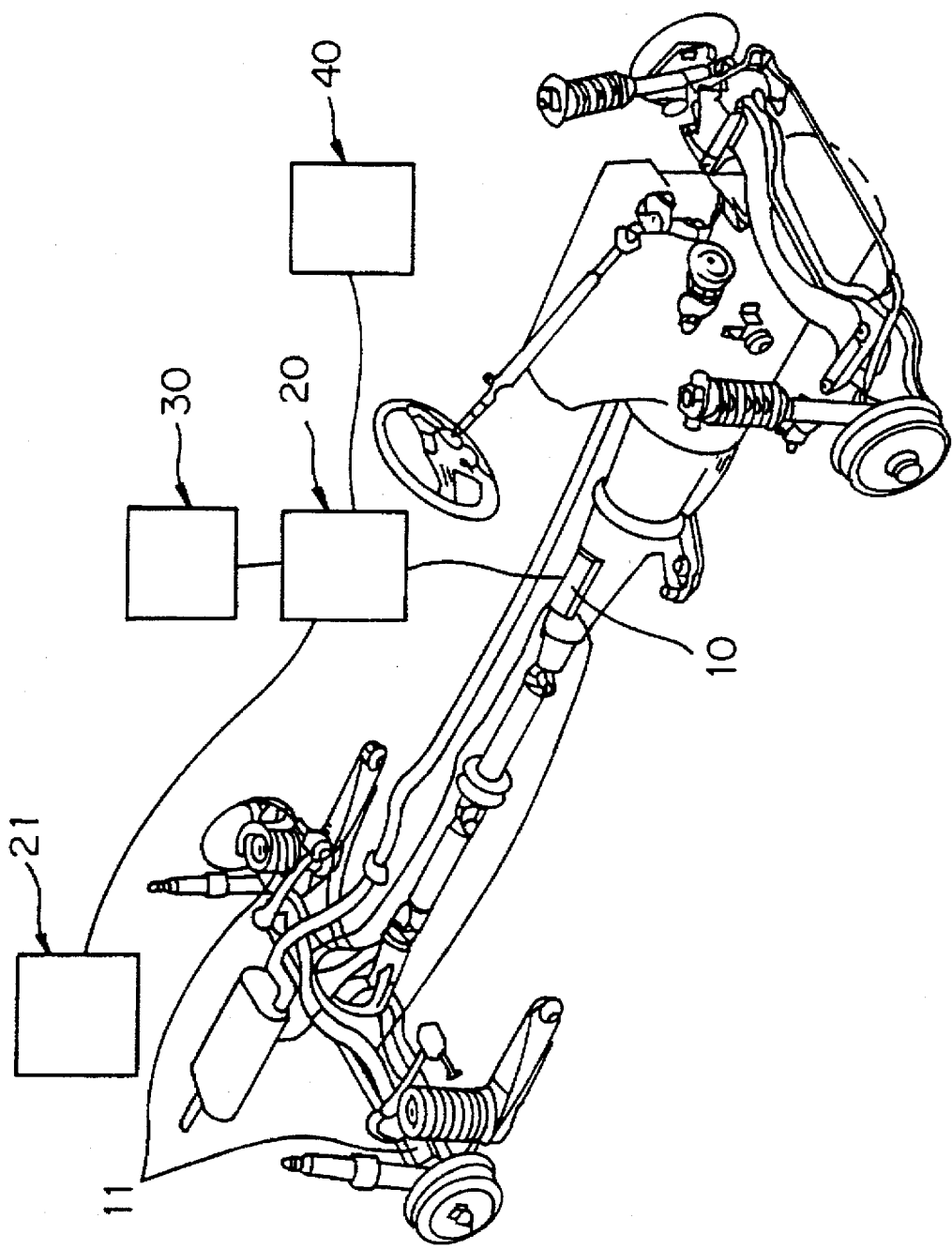
FIG. 2 is a schematic view illustrating an electronic parking brake device according to the present invention which is equipped in a vehicle.

FIG. 2 illustrates a block diagram of an electronic parking brake device according to the present invention which is equipped in a vehicle schematically shown in the figure. As shown in FIG. 2, the electronic parking brake device of the present invention includes a parking brake switch 30 adapted to deliver power from a battery to desired elements of the parking brake device and sensors. A slope sensor 10 is mounted on a part of the transmission. The slope sensor 10 comprises a potentiometer or capacitance-type sensor. The capacitance-type sensor includes two electrodes, liquid dielectric that vehicle is parked. The electronic parking brake device also and an RC oscillator. If the slope of a road varies, then the capacitance becomes different; therefore, an oscillating frequency of a signal from the RC changes. The slope sensor 10 receives power from the parking brake switch 30 so that it can be activated to sense the slope of a road on which the vehicle is parked. The electronic parking brake device also includes a parking brake control unit 20 for receiving an output signal from the slope sensor 10 and generating a control signal for controlling a desired driving element of the parking brake device, based on the received signal. The control signal from the parking brake control unit 20 is sent to a hydraulic value pressure control unit 21. The hydraulic pressure control unit 21 serves to control hydraulic pressure applied to a hydraulic caliper brake unit. The electronic parking brake device further includes a movement sensor 11 mounted on a desired portion of the rotation shaft of the wheels of the vehicle and adapted to sense a rotation of the wheels, and an alarming unit 40 adapted to generate an alarm under control of the parking brake control unit 20.

Now, the operation of the electronic parking brake device having the above-mentioned arrangement according to the present invention will be described in conjunction with FIGS. 3 and 4.

Figure 3:
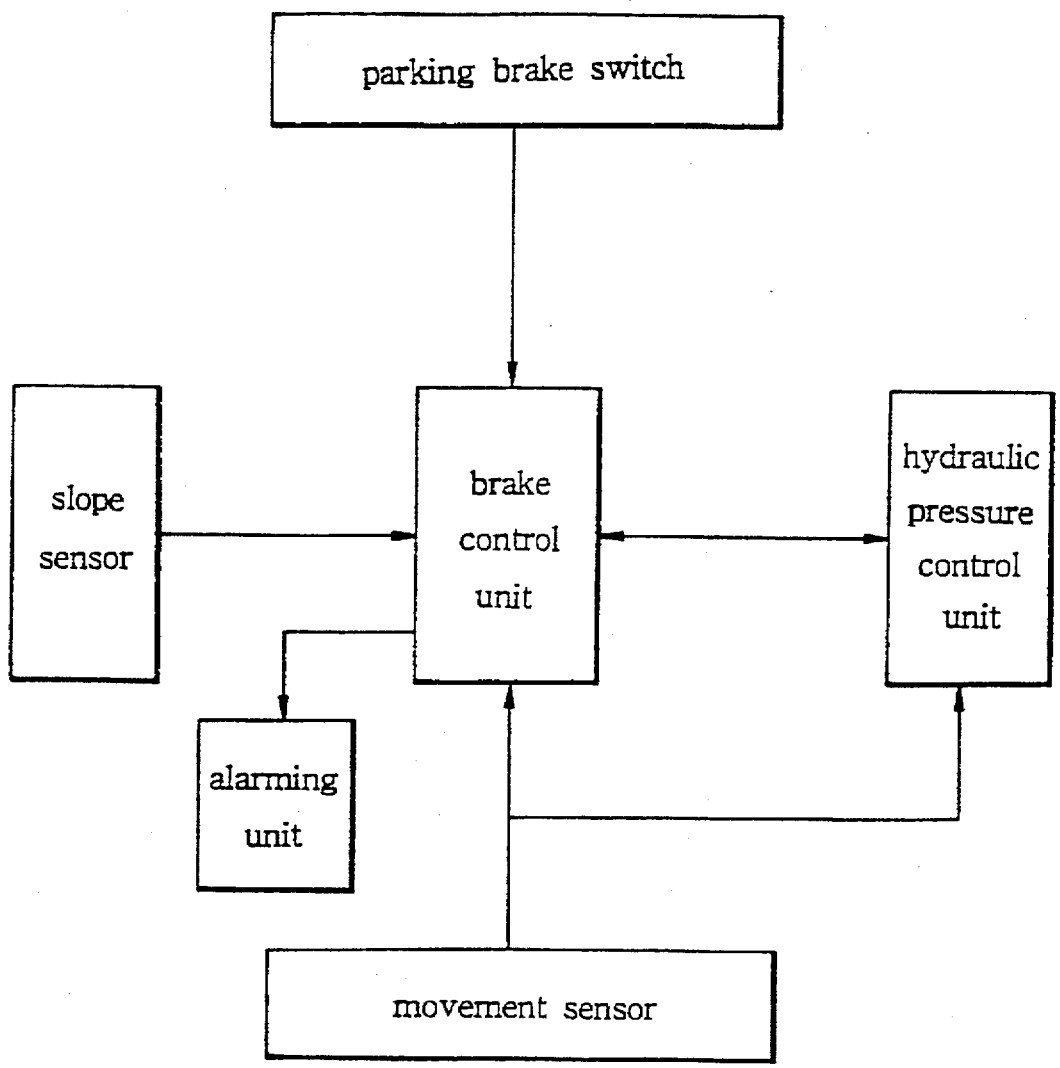
FIG. 3 is a block diagram of the electronic parking brake device according to the present invention.
Figure 4:
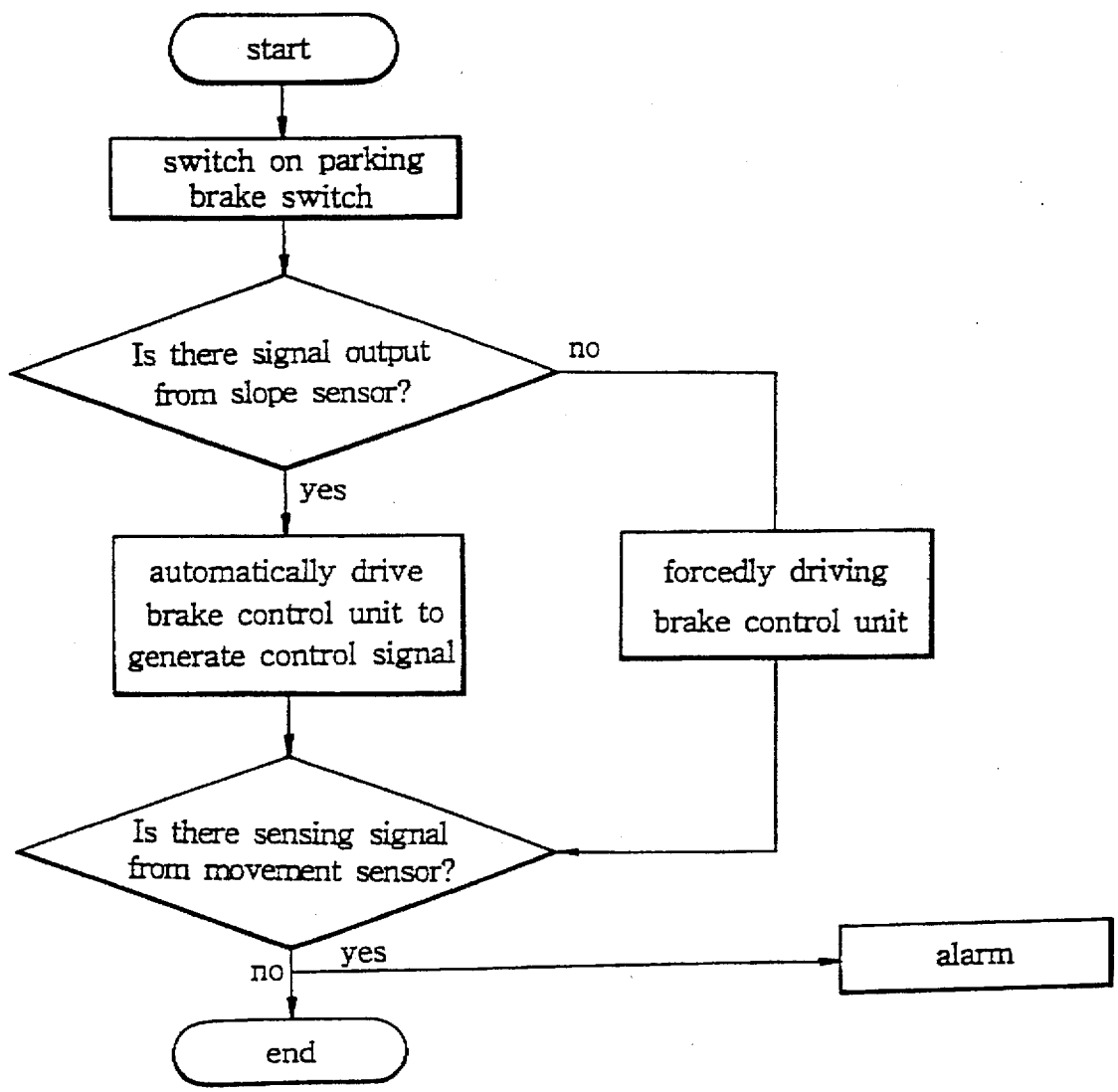
FIG. 4 is a flow chart illustrating a method for controlling the electronic parking brake device of FIG. 3 in accordance with the present invention.

As shown in FIG. 4 which is a flow chart illustrating a method for controlling the electronic parking brake device of FIG. 3, the parking brake switch 30 is first switched on when the vehicle is parked or abruptly stopped, in order to automatically actuate the parking brake by the electronic device. In the ON state of the parking brake switch 30, the slope sensor 10 is activated to sense the slope of the road on which the vehicle is parked. The parking brake control unit 20 receives a sensing signal generated from the slope sensor 10, thereby generating a control signal which is, in turn, sent to the hydraulic pressure control unit 21. Based on the control signal from the parking brake control unit 20, the hydraulic pressure control unit 21 controls hydraulic pressure applied to the hydraulic brake so as to prevent the wheels from rotating on the road. The hydraulic brake comprises a brake pedal, a master cylinder, piping, a wheel cylinder, a brake shoe and a brake drum. The operation is now described. When the driver desires to park his vehicle on a road with a slope, he switches on the parking brake switch 30, thereby activating the slope sensor 10. In this state, the slope sensor 10 senses the slope of the road and generates an electrical signal indicative of the sensed road slope. The parking brake control unit 20 then receives the electrical signal from the slope sensor 10, thereby generating a control signal for providing an appropriate braking force of the hydraulic brake. The control signal from the parking brake control unit 20 is sent to the hydraulic pressure control unit 21 which, in turn, generates the appropriate braking force of the hydraulic brake. In accordance with the control signal from the hydraulic pressure control unit 21, the hydraulic brake operates to generate a hydraulic brake force for preventing the wheels from rotating, thereby preventing the vehicle from being moved on the road. In order to achieve double security, the movement sensor 11 is also activated to sense a movement of the wheels. If there is no movement of the wheels sensed by the movement sensor 11, the operation of the electronic parking brake device is ended. On the other hand, when the slope sensor 10 does not work, thereby generating no sensing signal, the parking brake control unit 20 causes hydraulic pressure unit 21 to generate the maximum braking force. The sensors 10 and 11 are simultaneously actuated. The sensor 11 is installed as a secondary backup. In this case, the movement sensor 11 is then driven to check whether or not the wheels move. If the movement sensor 11 generates a sensing signal as it senses a movement of the wheels, the parking brake control unit 20 sends a control signal to the alarming unit 40 which, in turn, generates an alarm. Accordingly, the electronic parking brake device gives off an alarm. Thus, the electronic parking brake device can sense a movement of the vehicle in two ways, thereby not only providing an improvement in the security of passengers, but also surely preventing the vehicle from being damaged.

As apparent from the above description, the present invention provides an electronic parking brake device capable of receiving a sensing signal generated from a sensor on a road with a slope, thereby automatically achieving a parking braking operation. The electronic parking brake device also includes a movement sensor and a hydraulic pressure control unit in order to achieve a secondary parking brake control. By such an arrangement, the electronic parking brake device can prevent its brake control unit from malfunctioning due to electronic noise since the electronic parking brake device of the present invention automatically generates a parking brake force when the driver switches on only the brake switch. Accordingly, it provides safety and convenience to the driver. In particular, the electronic parking brake device of the present invention operates automatically to firmly prevent the vehicle from freely moving on a road with a slope. Accordingly, it is possible not only to provide an improvement in the security of passengers, but also to surely prevent the vehicle from being damaged.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an electronic parking brake device including a parking brake switch adapted to supply power to desired elements of the parking brake device, a slope sensor adapted to sense the slope of a road on which the vehicle is parked, a parking brake control unit adapted to generate a control signal based on a sensing signal from the slope sensor, a hydraulic brake unit adapted to generate a hydraulic brake force, and a hydraulic pressure control unit adapted to control hydraulic pressure applied to the hydraulic brake unit under a control of the parking brake control unit, a movement sensor adapted to sense a movement of the parked vehicle, and an alarming unit adapted to generate an alarm under control of the parking brake control unit, the method comprising the steps of:

switching on the parking brake switch to energize the slope sensor and the movement sensor;

determining whether or not the slope sensor has generated its sensing signal;

if the slope sensor has generated the sensing signal, automatically driving the parking brake control unit based on the sensing signal from the slope sensor, thereby generating a control signal for providing an appropriate driving condition of the hydraulic brake unit;

if the slope sensor has generated no sensing signal, the parking brake control unit causes the hydraulic pressure unit to generate the maximum braking force;

determining whether or not the movement sensor has generated its sensing signal; and if the movement sensor has generated its sensing signal, the operation of the brake device ends if no signal is sent from the movement sensor; and sending the sensing signal from the movement sensor to the parking brake control unit so that the parking brake control unit can send a control signal to the alarming unit to generate an alarm.

\* \* \* \* \*